United States Patent
Hasegawa et al.

(10) Patent No.: US 7,927,653 B2
(45) Date of Patent: Apr. 19, 2011

(54) METAL MOLD REPAIR METHOD AND METAL MOLD REPAIR PASTE AGENT

(75) Inventors: Michiharu Hasegawa, Tokyo (JP); Noriyuki Miyazaki, Tokyo (JP); Masafumi Nakamura, Tokyo (JP); Naoji Yamamoto, Tokyo (JP); Kazuo Ueda, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 400 days.

(21) Appl. No.: 12/086,595

(22) PCT Filed: Nov. 6, 2006

(86) PCT No.: PCT/JP2006/322068
§ 371 (c)(1),
(2), (4) Date: Jun. 16, 2008

(87) PCT Pub. No.: WO2007/069409
PCT Pub. Date: Jun. 21, 2007

(65) Prior Publication Data
US 2010/0159130 A1 Jun. 24, 2010

(30) Foreign Application Priority Data

Dec. 16, 2005 (JP) .................. 2005-363251
Dec. 16, 2005 (JP) .................. 2005-363501

(51) Int. Cl.
*B28B 7/38* (2006.01)
*B22C 3/00* (2006.01)
*B05D 3/00* (2006.01)
*B32B 43/00* (2006.01)
*B05C 13/00* (2006.01)
*B23P 6/00* (2006.01)
*B22D 19/10* (2006.01)
*B23K 31/00* (2006.01)
*B23K 31/02* (2006.01)

(52) U.S. Cl. ........ 427/142; 427/133; 427/135; 427/140; 228/119; 228/231; 29/402.01; 29/402.02; 29/402.18

(58) Field of Classification Search .............. 427/133, 427/135, 140, 142, 181, 190, 191, 192, 532, 427/535, 539, 543, 546; 228/119, 231; 29/401, 29/402, 402.01, 402.02, 402.09, 402.18
See application file for complete search history.

(56) References Cited

U.S. PATENT DOCUMENTS 3,925,065 A    12/1975  Osawa et al.
4,168,736 A *  9/1979   Richards .................. 164/54
5,806,751 A *  9/1998   Schaefer et al. ........... 228/119

FOREIGN PATENT DOCUMENTS
EP          836904 A2    4/1998
(Continued)

*Primary Examiner* — Frederick J Parker
*Assistant Examiner* — Michael Wieczorek
(74) *Attorney, Agent, or Firm* — Birch, Stewart, Kolasch & Birch, LLP

(57) ABSTRACT

Providing a metal mold repair method and a metal mold repair paste agent which are capable of repairing cracks with simple work.
A repair paste agent containing components that become an alloy is directly applied to a surface of a metal mold having a crack so as to cover the crack part, subsequently a surface of the repair paste agent is coated with an oxidation inhibitor and the repair paste agent is made to penetrate the inside of the crack by heating and becomes an alloy, thereby filling up the crack.

11 Claims, 6 Drawing Sheets

FOREIGN PATENT DOCUMENTS

| | | |
|---|---|---|
| JP | 49-90608 A | 8/1974 |
| JP | 10-137976 A | 5/1998 |
| JP | 2001-232493 A | 8/2001 |
| JP | 2001-288554 A | 10/2001 |
| JP | 2004-068047 A | 4/2004 |
| JP | 2005-097743 A | 4/2005 |

* cited by examiner

METAL MOLD REPAIR METHOD AND METAL MOLD REPAIR PASTE AGENT

TECHNICAL FIELD

The present invention relates to a metal mold repair method and a metal mold repair paste agent for repairing cracks in die-casting molds, etc.

BACKGROUND ART

In a common method for repairing a die-casting metal mold upon a crack occurring therein, as shown in FIG. 8, a large part of the metal mold surrounding the crack is removed by means of a cutting tool, the part where the removal has been performed is subjected to build-up welding, and then subjected to surface finishing.

As an improvement of the aforementioned common repair method, Patent Document 1 discloses performing build-up welding while melting powder for metal mold repair by means of a plasma arc. As the powder for metal mold repair, Patent Document 1 proposes an alloy powder consisting of a total 10 wt % or less of a carbide consisting of at least one of NbC, VC and WC, and the balance of a Ni—Cr—Mo-based heat resistant alloy.

Also, Patent Document 2 discloses applying a coating material, which has been prepared by dispersing metal powder in a solvent, to a base metal and heating the base metal to diffuse the metal in the base metal, and more specifically, it proposes: selecting at least one of Cu and Mn as an element to be diffused in the case where the base metal is a Zn alloy; selecting Cr in the case where the base metal is an Fe alloy; selecting at least one of Al, Cr, Ni and N in the case where the base metal is a Ti alloy; and selecting Ni in the case where the base metal is a Cu alloy.

Patent Document 1: Japanese Patent Laid-Open No. 2005-97743
Patent Document 2: Japanese Patent Laid-Open No. 2004-68047

In the method disclosed in Patent Document 1, when a crack is repaired, as in the conventional method, a part of the metal mold including the crack is cut off, and build-up welding is performed on the part where the cutting has been performed. Where build-up welding is performed, what is called secondary cracking, i.e., a crack occurring again in a part that is somewhat outside the part where the build-up welding has been performed, is prone to occur due to a thermal effect caused by the welding.

Also, in the conventional method, in some cases, a cutting tool cannot be used depending on the part where a crack occurs. In this case it takes a lot of trouble and time for repair.

Meanwhile, the content disclosed in Patent Document 2 makes it possible to improve the properties of the base metal surface, but cannot be applied to repairing a crack in a metal mold because the coating material itself does not become an alloy by means of thermal treatment.

DISCLOSURE OF THE INVENTION

In the metal mold repair method according to the present invention, a repair paste agent containing components that become an alloy is directly applied to a surface of a metal mold having a crack so as to cover the crack part, then the surface of the repair paste agent is coated with an oxidation inhibitor and furthermore, the repair paste agent is made to penetrate the inside of the crack by heating and become an alloy, thereby filling up the crack.

For the oxidation inhibitor, for example, salt (NaCl) is suitable. Where salt (NaCl) is used, coating is performed after salt is deposited and then heated for liquification, and at that time, it is possible to provide weirs to prevent the liquefied salt from flowing out to the surrounding area.

Also, prior to heating and thereby melting the metal mold repair paste agent, it is preferable to heat the base metal surface to a white heat except for the metal mold repair paste agent part. As a result of doing so, the metal mold repair paste agent can be easily heated and thereby melt without losing heat to the base metal.

Also, before coating with the oxidation inhibitor, it is preferable to form a decarburization preventive layer on the surface of the metal mold repair paste agent to prevent carbon from being lost by heating.

For heating means, it is possible to employ, for example, local heating using a high frequency wave, overall heating using a temper furnace or overall heating using a vacuum furnace, but from the perspective of workability and simplicity it is most preferable to use a burner.

Also, an object of a metal mold repair paste agent according to the present invention is to fill up a crack in a metal mold by being directly applied to the crack and then being heated to diffuse in the inside of the metal mold and become an alloy.

Alloy components contained in the metal mold repair paste agent include Ni (nickel) as a main component, with addition of at least Mn (manganese), W (tungsten) and Fe (iron). Also, other than an agent prepared by dispersing a plurality of metal powder in a binder (solvent) to be a paste, an agent prepared by reducing an alloy formed of two or more kinds of metal to a powder and dispersing it in a binder may used.

The alloy components are specifically indicated below. The percentages mean mass %.

| | |
|---|---|
| Mn (manganese): | no less than 15% and no more than 20% |
| W (tungsten): | no less than 8% and no more than 15% |
| Fe (iron): | no less than 2% and no more than 12% |
| Co (cobalt): | no more than 7% |
| Cr (chrome): | no more than 7% |
| Si (silicon): | no more than 7% |
| C (carbon): | no more than 2% |
| B (boron): | no more than 2% |
| Ni (nickel): | balance. |

The above percentages of the components are determined for the following reasons.

Mn (manganese) is added because it has the general properties of enhancing hardenability, wear resistance and strength. Also, Mn exerts an effect as a deoxidizing agent, and prevents embrittlement caused by S (sulfur). However, when it is added in a large amount, a hardening crack occurs or retained austenite is generated, thereby causing embrittlement. In the present invention, the above-indicated percentage of Mn is added with the main aim of enhancing the wear resistance of an alloy to be formed.

W (tungsten) is added because it has the general properties of producing a (structural) carbide, enhancing hardness, and increasing tempering resistance. In particular, by the existence of Cr, tempering resistance is further increased, causing secondary hardening, thereby increasing wear resistance. However, addition of a large amount of W results in embrittlement. In the present invention, the above-indicated percentage of W is added with the main aim of enhancing the tempering resistance of an alloy to be formed.

Fe (iron) is a semi-essential component for alloy formation, and its properties cannot be exerted when the amount of Fe is overly small or large, and accordingly, the above-indicated percentage is employed.

Co (cobalt) is added because it has the general properties of strengthening a martensitic matrix, increasing wear resistance, and hardness at high temperatures, and enhancing hot strength retention. In the present invention, the above-indicated percentage of Co is added with the main aim of retaining the hot strength of an alloy to be formed.

Cr (chrome) has the general properties of producing a stable carbide, thereby increasing corrosion resistance and wear resistance, and a carbide suppresses the growth of crystal grains, promotes carburizing, enhances hardenability, increases oxidation resistance and improves toughness. Also, Cr produces a complex carbide together with V, Mo or W, etc., thereby increasing tempering resistance. In the present invention, the above-indicated percentage of Cr is added with the main aim of enhancing the wear resistance of an alloy to be formed.

Si (silicon) has the general properties of having a high deoxidation effect and increasing tempering resistance at low temperatures. Addition of a large amount of Si results in cementite graphitization, which causes embrittlement or hinders castability. Also, addition of a small amount of Si increases hardness and strength, increases oxidation resistance, and suppresses the growth of crystal grains due to heating. In the present invention, the above-indicated percentage of Si is added with the main aim of enhancing the oxidation resistance of an alloy to be formed.

C (carbon) has the general properties of raising the distortion factor of martensite, thereby increasing hardening hardness. It produces a carbide together with Fe, Cr, Mo or V, etc., thereby increasing strength. It increases tensile strength. As the amount of carbide is increased, wear resistance increases. In the present invention, the above-indicated percentage of C is added with the main aim of enhancing the tensile strength of an alloy to be formed.

B (boron) has the general properties of drastically increasing hardenability when it is added in only a minute amount, while generating $Fe_2B$ thereby causing red shortness when it is added in an excessive amount. Addition of a small amount of B increases durability for cuts. Also, it makes the eutectic carbide smaller. In the present invention, the above-indicated percentage of B is added with the main aim of making the eutectic carbide in the alloy to be formed finer.

Ni (nickel), as with Fe, is an essential component for alloy formation, and addition of a small amount of Ni increases hardenability and toughness, but the addition of an excessive amount of Ni generates austenite, causing embrittlement, and accordingly, the above-indicated percentage is employed.

The metal mold repair method and metal mold repair paste agent according to the present invention make it possible to repair cracks with simple work, and in addition, problems such as secondary cracking will not occur after repair.

BEST MODE FOR CARRYING OUT THE INVENTION

Hereinafter, an embodiment of the present invention will be described based on the referenced drawings.

Figure 1:
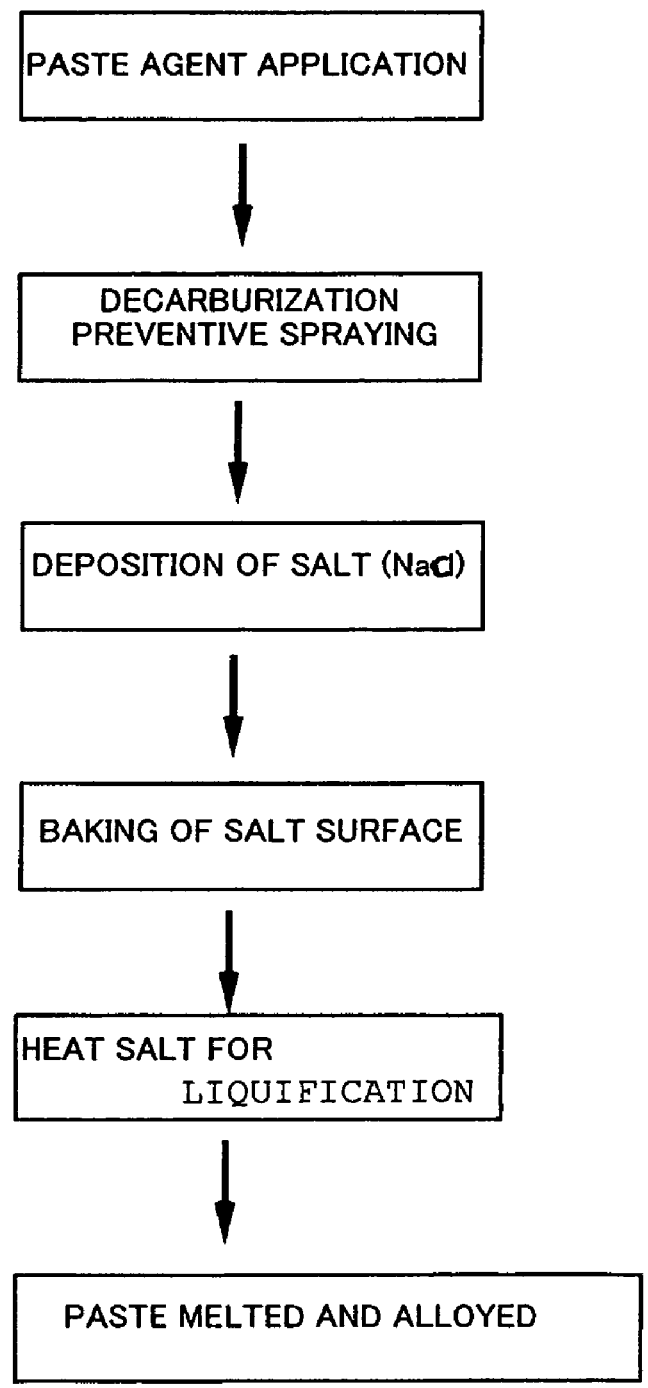
FIG. 1 is a diagram describing an example of a metal mold repair method using a metal mold repair paste agent according to the present invention.

First, as shown in FIG. 1, the aforementioned metal mold repair paste agent is applied to a metal mold with the part of the metal mold having a crack determined as the center. A blending example of the metal mold repair paste agent is indicated in (Table 1).

TABLE 1

| Symbol | Element Name | Particle Diameter | Content |
|---|---|---|---|
| Fe | Iron | 3-5 μm | 25-35 g |
| Ni | Nickel | 1-3 μm | 90-110 g |
| Co | Cobalt | 4-6 μm | 10-20 g |
| Mn | Manganese | 8-12 μm | 50-70 g |
| Si | Silicon | 40-50 μm | 15-20 g |
| C | Carbon | 4-6 μm | 4-8 g |
| B | Boron | 8-12 μm | 4-8 g |
| Cr | Chromium | 8-12 μm | 15-20 g |
| W | Tungsten | 4-6 μm | 35-45 g |
|  |  | Elemental Powder Mass | 300 g |
| Binder | Epoxy Resin |  | 25-30 g |
|  | Acetone |  | 140-160 g |

Next, a decarburization preventive is sprayed to the surface of the metal mold repair paste agent and salt is deposited on the metal mold repair paste agent with the aim of oxidation inhibition processing.

Subsequently, the surface of the salt is baked and the base metal surface is heated to a white heat (approximately 1100° C.) except the metal mold repair paste agent part.

Subsequently, the salt is heated for liquification, and the surface of the metal mold repair paste agent is coated with the liquefied salt, and furthermore, the metal mold repair paste agent is heated. The metal mold repair paste agent is melt by means of the heating performed so far and penetrates the inside of the crack and becomes an alloy.

When the melting of the metal mold repair paste agent has been confirmed, finally, the melt metal mold repair paste is heated for finishing in such a manner that the heating smoothes out the contour of the melt metal mold repair paste.

FIGS. 2 to 7 are photographs of metal textures illustrating metal mold repair processes.

Figure 2:
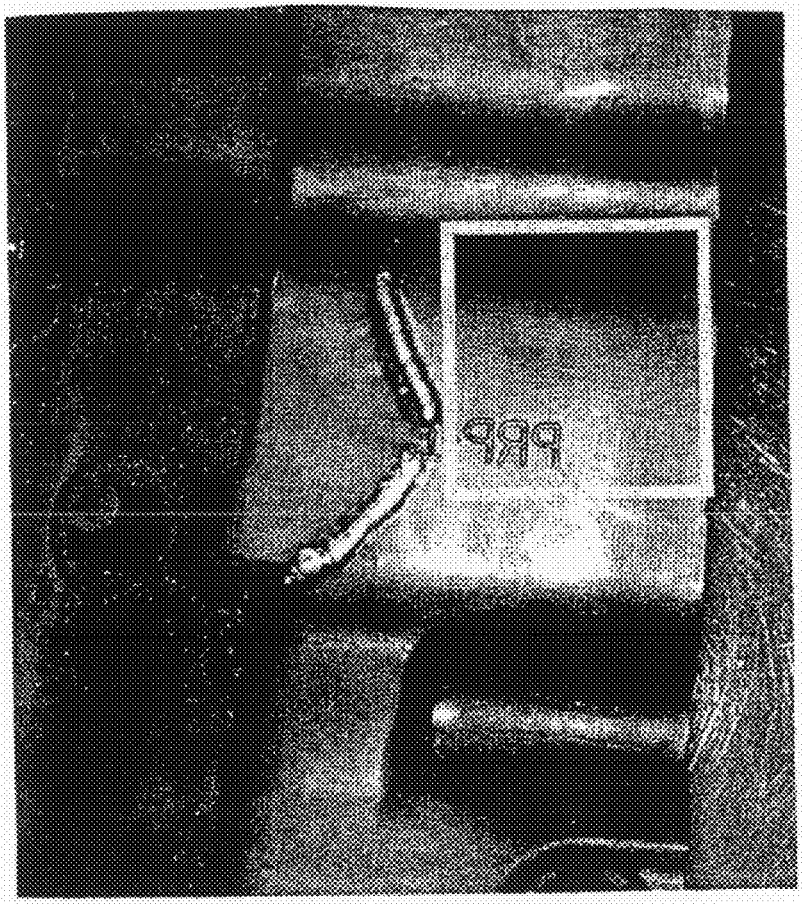
FIG. 2 is a photograph illustrating a metal texture of a metal mold before repair.
Figure 3:
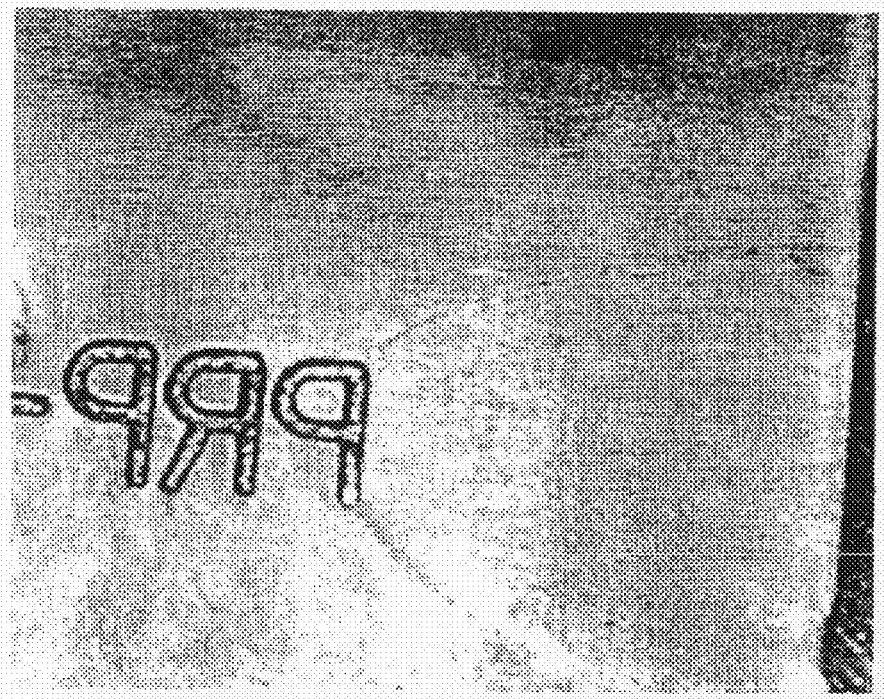
FIG. 3 is a close-up photograph of FIG. 2.

FIG. 2 shows a metal mold before repair, and FIG. 3 shows a close-up of the part enclosed with the quadrangle shown in FIG. 2. It can be seen from these photographs that a crack occurs in such a manner that it intersects with a letter (a reversed letter of P) on the metal mold surface.

Figure 4:
FIG. 4 is a photograph illustrating a state in which the part enclosed by a quadrangle in FIG. 2 is cut off and a part of a crack is repaired by a method according to the present invention.

FIG. 4 is a photograph illustrating a state in which the part enclosed with the quadrangle shown in FIG. 2 has been cut off and a part of the crack has been repaired by means of a method according to the present invention, and it can be seen from this photograph that the crack disappears from the surface at the repaired part.

Figure 5:
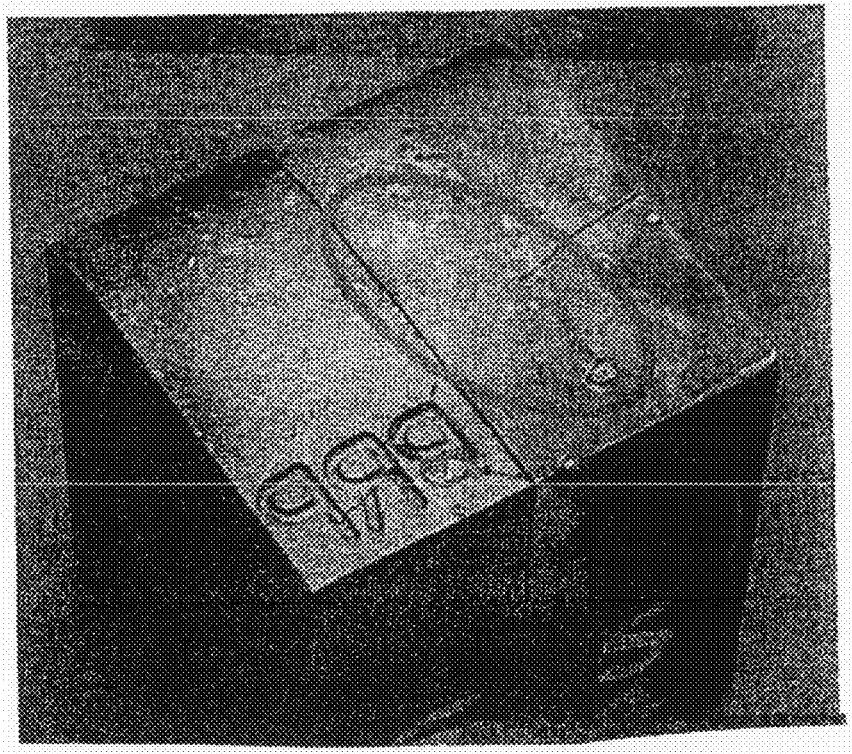
FIG. 5 is a photograph in which a metal mold is cut in such a manner that the cut intersects with a repaired part.
Figure 6:
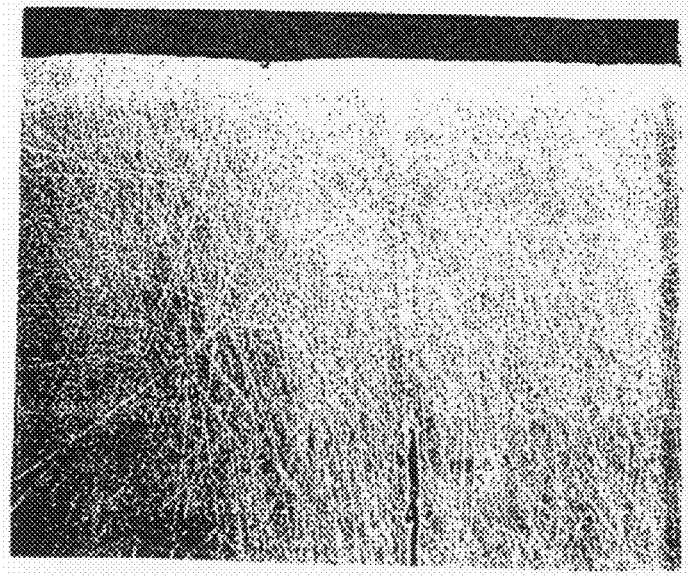
FIG. 6 is a micrograph illustrating the metal texture of a cut surface.
Figure 7:
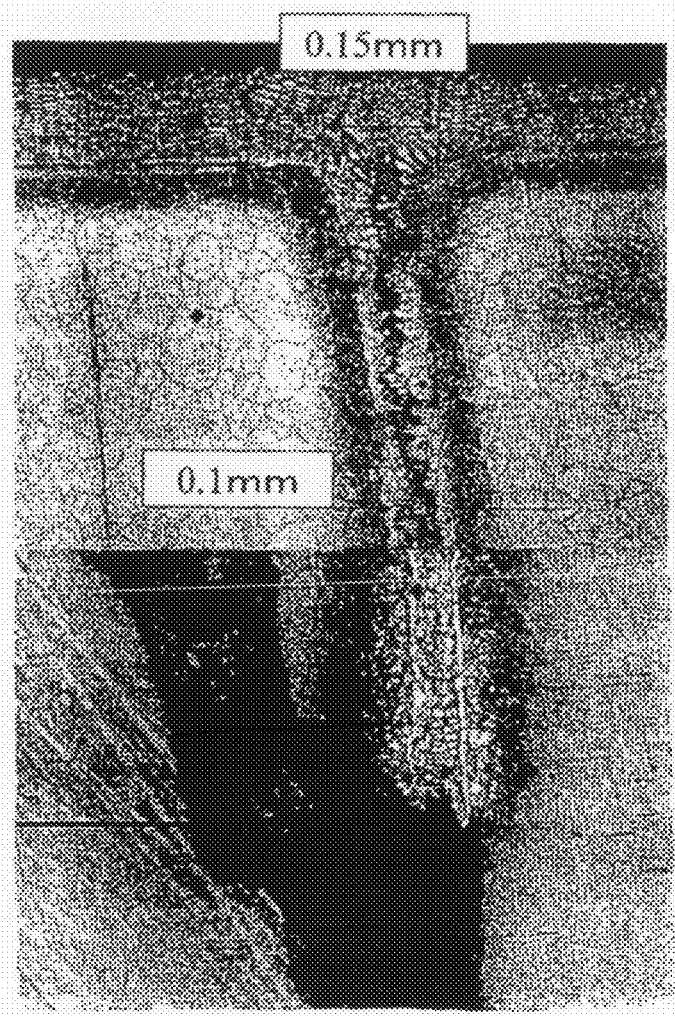
FIG. 7 is a close-up photograph of FIG. 6.
Figure 8:
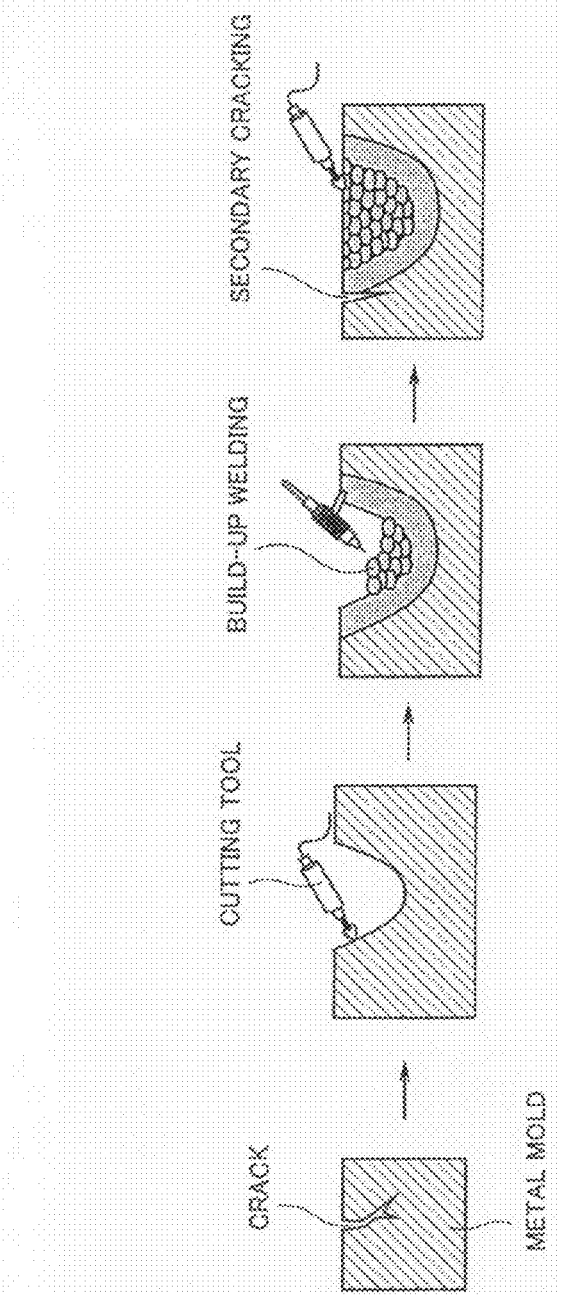
FIG. 8 is a diagram describing a conventional metal mold repair procedure.

FIG. 5 is a photograph of a metal mold cut in such a manner that the cut intersects with the repaired part, FIG. 6 is a microgram illustrating the cut surface, and FIG. 7 is a close-up photograph of FIG. 6. It can be seen from these photographs that: the metal mold repair paste agent is melt and penetrates the inside of the crack and after cooling, it becomes an alloy; and also, it partly diffuses at the boundary with the metal mold.

Incidentally, the alloy is formed so that it reaches the part of the crack having a width of 0.1 mm, the thickness of the alloy layer formed on the metal mold surface was 0.15 mm, the hardness of the alloy part of the surface was HV356 (36HRC), the hardness of the alloy part in the crack was HV324 (33HRC), and the hardness of the base metal was HV637 (57HRC).

The above embodiment is merely an example of one embodiment, and a heat treatment method using a burner has been described as a repair method, but for heating means, it is also possible to employ, for example, local heating using a high frequency wave, overall heating using a temper furnace, or overall heating using a vacuum furnace.

Also, in the example, an agent prepared by dispersing a plurality of metal powder in a binder (solvent) to be a paste was used, but an agent prepared by reducing an alloy formed of two or more kinds of metal to a powder and dispersing it in a binder may be used.

The invention claimed is:

1. A metal mold repair method comprising: depositing a metal mold repair paste agent containing components on a surface of a metal mold so as to cover a crack occurring in the metal mold, said components to become an alloy; coating a surface of the metal mold repair paste agent with an oxidation inhibitor; and subsequently, heating and thereby melting the metal mold repair paste agent to penetrate the inside of the crack and become an alloy.

2. The metal mold repair method according to claim 1, wherein the oxidation inhibitor is salt (NaCl).

3. The metal mold repair method according to claim 1, wherein prior to heating and melting the metal mold repair paste agent, a surface of a base metal is heated to a white heat except for the metal mold repair paste agent part.

4. The metal mold repair method according to claim 1, wherein a decarburization preventive layer is formed on a surface of the metal mold repair paste agent, and the decarburization preventive layer is coated with the oxidation inhibitor.

5. The metal mold repair method according to claim 1, wherein the heating is performed using a burner.

6. The metal mold repair method according to claim 2, wherein prior to heating and melting the metal mold repair paste agent, a surface of a base metal is heated to a white heat except for the metal mold repair paste agent part.

7. The metal mold repair method according to claim 2, wherein a decarburization preventive layer is formed on a surface of the metal mold repair paste agent, and the decarburization preventive layer is coated with the oxidation inhibitor.

8. The metal mold repair method according to claim 3, wherein a decarburization preventive layer is formed on a surface of the metal mold repair paste agent, and the decarburization preventive layer is coated with the oxidation inhibitor.

9. The metal mold repair method according to claim 2, wherein the heating is performed using a burner.

10. The metal mold repair method according to claim 3, wherein the heating is performed using a burner.

11. The metal mold repair method according to claim 4, wherein the heating is performed using a burner.

* * * * *